United States Patent [19]

Tsuge et al.

[11] Patent Number: 4,993,656
[45] Date of Patent: Feb. 19, 1991

[54] WEBBING RETRACTOR

[75] Inventors: Hiroshi Tsuge; Yasutaka Watanabe; Fuminori Teraoka; Shinji Mori, all of Aichi, Japan

[73] Assignee: Kabushiki Kaisha Tokai-Rika-Denki-Seisakusho, Japan

[21] Appl. No.: 414,512

[22] Filed: Sep. 29, 1989

[30] Foreign Application Priority Data

Oct. 7, 1988 [JP] Japan .............................. 63-131713[U]

[51] Int. Cl.⁵ ........................ B60R 22/38; B60R 22/40
[52] U.S. Cl. ........................ 242/107.4 A; 242/107.4 B
[58] Field of Search .................. 242/107.4 A, 107.4 B; 280/806; 297/478, 480

[56] References Cited

U.S. PATENT DOCUMENTS

| | | | |
|---|---|---|---|
| 4,749,142 | 6/1988 | Saitow | 42/107.4 A X |
| 4,809,926 | 3/1989 | Koike | 242/107.4 B |
| 4,830,310 | 5/1989 | Higbee | 242/107.4 A X |

FOREIGN PATENT DOCUMENTS 62-95058  6/1985  Japan .

Primary Examiner—John M. Jillions
Attorney, Agent, or Firm—Sixbey, Friedman, Leedom & Ferguson

[57] ABSTRACT

A webbing retractor which, when a webbing is drawn out instantaneously, prevents the drawing out of the webbing by operating a lock mechanism. In addition, when a vehicle is decelerated suddenly, the drawing out of the webbing is also instantaneously prevented by causing a pawl to engage with a lock wheel preventing the lock wheel from rotating. The webbing retractor includes a lever which is swung in such a manner as to be movable between a first position in which the pawl is made unengageable with the lock wheel and a second position in which the pawl is made engageable with the lock wheel. The webbing retraction also includes a lever swing member which causes the lever to be located in the first position as the take-up shaft rotates in a webbing taking-up direction and to be situated in the second position as the take-up shaft rotates in a webbing draw-out direction. Accordingly, the pawl is prevented from engaging with the lock wheel at a take-up limit of the webbing.

20 Claims, 13 Drawing Sheets

F I G.12
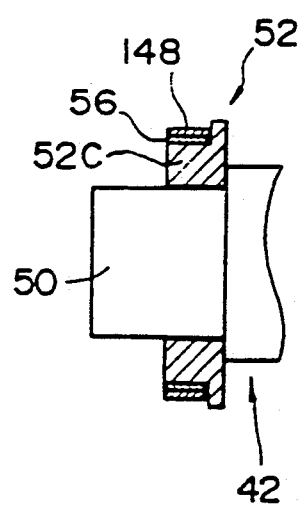

WEBBING RETRACTOR

BACKGROUND OF THE INVENTION

1. Field of the Invention

The present invention relates to a webbing retractor which, during a sudden deceleration of a vehicle, is capable of instantaneously stopping the rotation of a take-up shaft in a webbing drawing-out direction by the operation of a lock mechanism which results from a lock wheel and the take-up shaft undergoing relative rotation due either to the engagement, with the lock wheel, of a pawl operated by sensing the sudden deceleration, or the sudden drawing out of the webbing at the time of sudden deceleration.

2. Description of the Related Art

Among webbing retractors that are mounted on vehicles, there is a type (which is called WSIR) which is adapted to operate a lock mechanism by sensing a sudden drawing out of the webbing and then making it possible to instantaneously prevent the drawing out of the webbing.

With this type of webbing retractor, when the webbing is drawn out suddenly by the occupant's inertia during a sudden deceleration of the vehicle, a delay in rotation normally occurs in a lock wheel which follows the rotation of a take-up shaft. This causes the lock mechanism to operate, thereby keeping the occupant in a restricted state by instantaneously preventing the drawing out of the webbing.

The cancellation of the lock mechanism operation is effected by rotating the take-up shaft by a small amount in a direction in which the webbing is taken up.

At this juncture, when the occupant unfastens the webbing, the take-up shaft is urged in the webbing take-up direction by means of an urging means. When the occupant releases the webbing, there is a case where the webbing is taken up quickly. In this case, since the rotation of the take-up shaft stops suddenly at a take-up limit of the webbing, relative rotation occurs in the lock wheel with respect to the take-up shaft due to inertia. Therefore, the state becomes identical to that in which the webbing is drawn out suddenly.

As a result, the lock mechanism is actuated which prevents the take-up shaft from rotating in the webbing draw-out direction. To cancel this state, it is necessary to rotate the take-up shaft by a small amount in the webbing taking-up direction, as described above. However, since a major portion of the webbing has already been taken up, there are cases where the cancellation is cumbersome and takes time.

In order to overcome the aforementioned drawback, a webbing retractor has been developed as disclosed in Japanese Utility Model Laid-Open No. 95058/1987. The webbing retractor is arranged in such a manner that a displacing member is disposed on a rotating member rotating integrally with the take-up shaft. The lock wheel is prevented from rotating in the webbing take-up direction relative to the take-up shaft by causing the displacing member to be engaged with the lock wheel as the take-up shaft rotates in the webbing take-up direction. In addition, the displacing member is disengaged from the lock wheel as the take-up shaft rotates in the webbing draw-out direction, permitting the take-up shaft to rotate in the webbing draw-out direction relative to the lock wheel.

On the other hand, there is another type of webbing retractor (VSIR) which is adapted to prevent the lock wheel from rotating by means of a pawl actuated by sensing a sudden deceleration of the vehicle, whereby a delay in operation normally occurs in the lock wheel which rotates by following the rotation of the take-up shaft so as to instantaneously prevent the drawing out of the webbing.

There is a demand to incorporate the functions of such a webbing retractor (VSIR) into a webbing retractor (WSIR) which is capable of preventing the rotation of the lock wheel in the webbing take-up direction relative to the take-up shaft at a take-up limit of the webbing in the same way as Japanese Utility Model Laid-Open No. 95058/1987.

In this case, however, when the rotation of the take-up shaft is stopped suddenly at the take-up limit of the webbing, there is the possibility of the pawl becoming engaged with the lock wheel due to a shock occurring at that time. In addition, if the webbing is subsequently drawn out in that state, the webbing drawing-out force can be imparted to the pawl via the lock wheel, possibly causing damage to the pawl.

SUMMARY OF THE INVENTION

Accordingly, an object of the present invention is to provide a webbing retractor which is capable of preventing a webbing drawing-out force from being imparted to the pawl even if the webbing is drawn out from a take-up limit of the webbing, thereby overcoming the above-described drawback of the conventional art.

To this end, according to the present invention, there is provided a webbing retractor for taking up a webbing worn by a seat occupant of a vehicle, comprising: a take-up shaft by which the webbing is retained and which is urged in a direction in which the webbing is taken up; a lock wheel axially supported by the take-up shaft and adapted to be rotatable relative to the take-up shaft; lock means which is interposed between the take-up shaft and the lock wheel and which operates so as to prevent the take-up shaft from rotating in a direction in which the webbing is drawn out; a pawl which is engaged with the lock wheel at the time of a sudden deceleration of the vehicle and causes the lock wheel and the take-up shaft to rotate relative to each other so as to operate the lock means; a rotating member adapted to rotate integrally with the take-up shaft; a displacing member, which is supported by the rotating member, is moved to a first position by the rotation of the take-up shaft in the webbing take-up direction, and is engaged with the lock wheel so as to prevent rotation of the lock wheel relative to the take-up shaft, is moved to a second position by the rotation of the take-up shaft in the draw-out direction and is disengaged from the lock wheel so as to permit the relative rotation of the lock wheel; a lever which is swingable between a third position, in which the engagement of the pawl with the lock wheel is prevented, and a fourth position, in which the engagement of the pawl with the lock wheel is permitted; and lever swinging means which causes the lever to be located in the third position when the take-up shaft rotates in the take-up direction and causes the lever to be located in the fourth position when the take-up shaft rotates in the draw-out direction.

In accordance with the present invention having the above-described arrangement, at the time when the webbing is taken up, the lever is swung to the first position by the lever swinging means to make the pawl unengageable with the lock wheel, so that even if the rotation of the take-up shaft is stopped suddenly at a take-up limit of the webbing and a shock is thereby generated, the pawl is prevented from engaging with the lock means as a result of that shock.

Accordingly, even if the webbing is drawn out from the take-up limit of the webbing, this drawing-out force is prevented from being imparted to the pawl via the lock wheel.

The above and other objects, features and advantages of the present invention will become more apparent from the following detailed description of the invention when read in conjunction with the accompanying drawings.

BRIEF DESCRIPTION OF THE DRAWINGS

FIG. 12 is a cross-sectional view illustrating a state in which a friction spring shown in FIG. 11 is fitted;

DESCRIPTION OF THE PREFERRED EMBODIMENTS

Referring to the accompanying drawings, a description will now be given of the preferred embodiments of the present invention.

Figure 1:
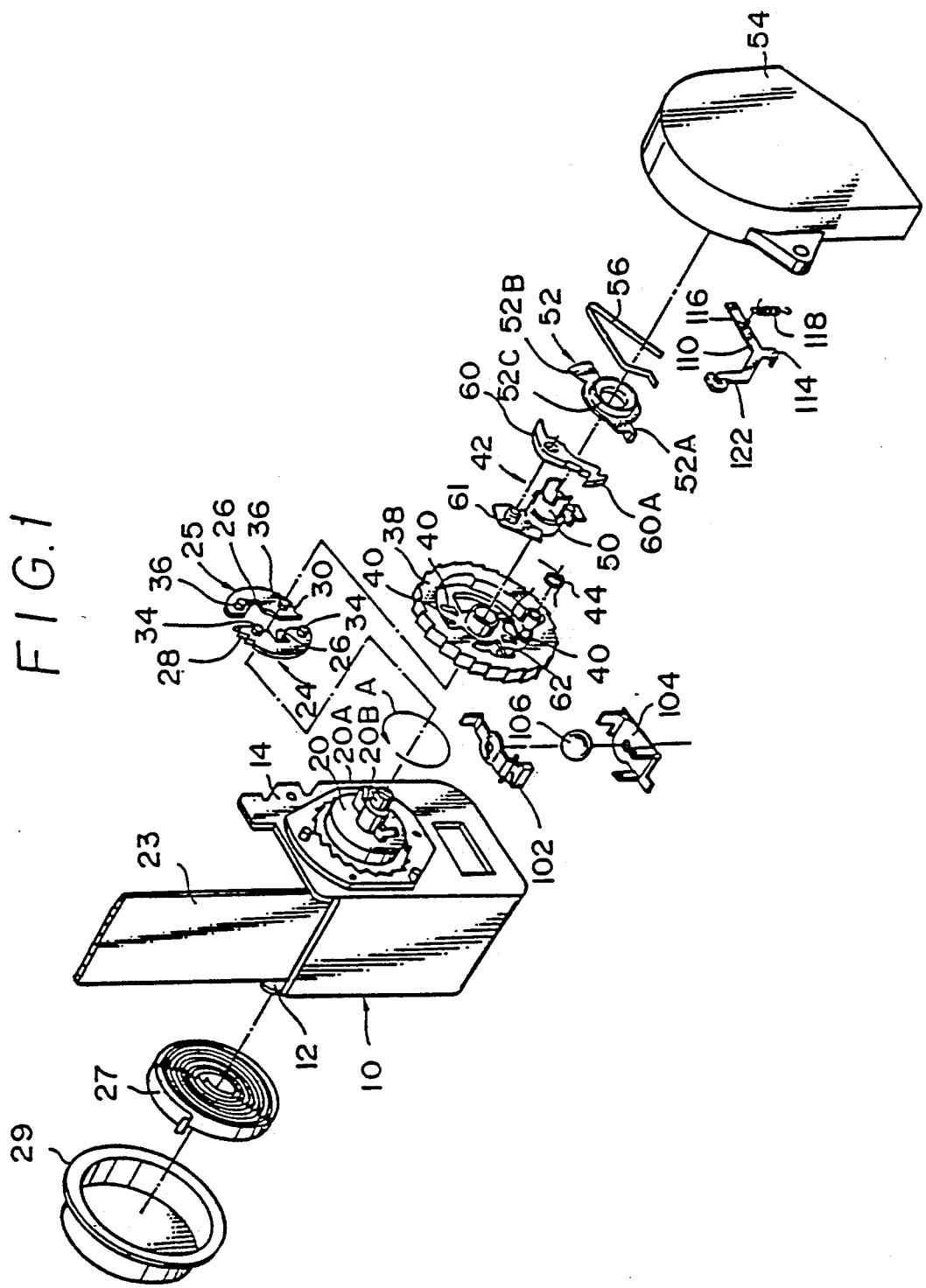
FIG. 1 is an exploded perspective view of a webbing retractor in accordance with a first embodiment of the present invention.

FIG. 1 is a perspective view of a webbing retractor in accordance with a first embodiment of the present invention.

A frame 10 has a pair of legs which extend from opposite sides of a base portion thereof and in parallel with each other. A take-up shaft 20 is rotatably supported by the legs 12, 14. An end of a webbing 23 for restraining a seat occupant is retained by the take-up shaft 20.

One longitudinal end portion of the take-up shaft 20 projects outwardly from the leg 12. An inner end of a spiral spring 27 is retained by this projecting portion. An outer end of the spiral spring 27 is retained by a spring cover 29 secured to the leg 12 and accommodates the spiral spring 27. As a result, the arrangement is such that the take-up shaft 20 is rotatively urged in the direction of arrow A in FIG. 1 by the urging force of the spiral spring 27 so as to take up the webbing 23 in the form of rolled layers.

Figure 2:
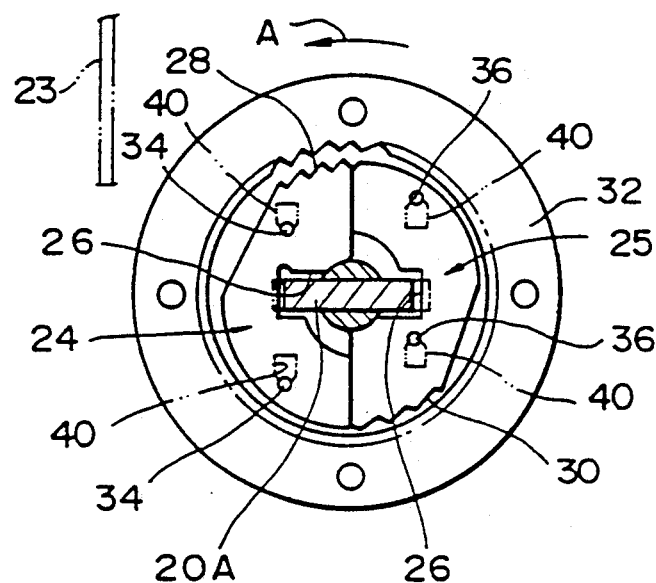
FIGS. 2 and 3 are front elevational views explaining the operation of a lock mechanism of the retractor in accordance with the first embodiment.

The other end of the take-up shaft 20 projects outwardly from the leg 14, and a fork end portion 20A is formed at this projecting portion. Disposed around the fork end portion 20A are a pair of lock plates 24, 25 which constitute parts of a lock mechanism, as also shown in FIG. 2. These lock plates 24, 25 are each formed into a substantially C-shaped configuration in which a substantially U-shaped notch 26 is formed in a central portion thereof. The fork end portion 20A of the take-up shaft 20 is situated in these notches 26. Both of the notches 26 are formed in such a manner that, as shown in FIG. 2, the breadth thereof (vertical length as viewed in the drawing) is slightly greater than the breadth (ditto) of the fork end portion 20A, so that the lock plates 24, 25 are rotatable by a predetermined angle relative to the take-up shaft 20.

Claw portions 28, 30 are respectively formed at one end of the lock plates 24, 25 in such a manner as to oppose the lock teeth of an internal ratchet wheel 32 which is secured to the leg 14 and, together with the lock plates 24, 25, constitute the lock mechanism.

Furthermore, returning to FIG. 1, two pairs of pins 34, 36 are respectively provided on the lock plates 24, 25 in such a manner as to project therefrom, and are respectively inserted in elongated holes 40 formed in a lock wheel 38. The lock wheel 38 is axially supported by a small-diameter shaft portion 20B projecting from an axially central portion of the take-up shaft 20. Thus, the lock wheel 38 is rotatable relative to the take-up shaft 20. A rotor 42 is disposed about the axis of this lock wheel 38 on the side remote from the side where the lock plates 24, 25 are provided.

The rotor 42 is fitted over a distal end of the small-diameter shaft portion 20B which passes through the lock wheel 38 and is hence rotatable integrally with the take-up shaft 20. A torsion coil spring 44 is interposed between the rotor 42 and the lock wheel 38.

The torsion coil spring 44 urges the lock wheel 38 relative to the rotor 42 in the draw out direction of the webbing (in the opposite direction of arrow A in FIG. 1). By means of this urging force, as shown in FIG. 2, the pins 34, 36 of the lock plates 24, 25 are held at the ends of the elongated holes 40. In consequence, the claw portions 28, 30 are spaced apart from the internal ratchet wheel 32 and, at the same time, the lock wheel 38 (see FIG. 1) is prevented from rotating further relative to the rotor 42 in the direction of drawing out the webbing.

Figure 3:
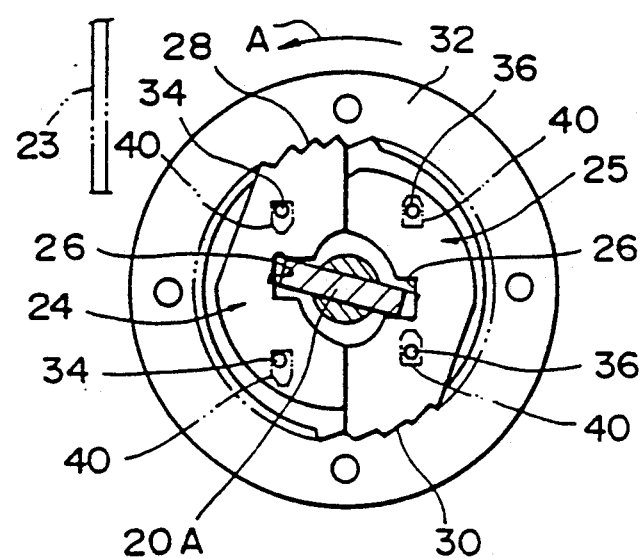

In addition, when the take-up shaft 20 rotates in the webbing drawing-out direction relative to the lock wheel 38 by deforming the torsion coil spring 44 against its urging force, the lock wheel 38 undergoes a delay in rotation relative to the take-up shaft 20, and the take-up shaft 20 presses the lock plates 24, 25. Consequently, with their pins 34, 36 guided by the elongated holes 40, the lock plates 24, 25 move in the longitudinal direction of the elongated holes 40 and cause their claw portions 28, 30 to be engaged with the internal ratchet wheel 32, as shown in FIG. 3. This movement of the lock plates 24, 25 can also occur when the lock wheel 38 deforms the torsion coil spring 44 against its urging force and causes the take-up shaft 20, rotating in the webbing take-up direction, to rotate further in that direction.

As one can see in FIG. 1, a pin 61 is provided on the rotor 42 at a position offset from the center of its rotation. A hold lever 60, which is a displacing member, is pivotally supported by the pin 61 in such a manner as to be swingable. The hold lever 60 has a pawl 60A formed at one end thereof. The pawl 60A is opposed to a notch 62 formed on an inner periphery of a recessed portion of the lock wheel 38. The pawl 60A is adapted to move into or out of the notch 62 of the lock wheel 38 as the hold lever 60 swings about the pin 61.

Furthermore, the rotor 42 is provided with a cylindrical portion 50 about the center of its rotation. A cam 52 is pivotally supported by the cylindrical portion 50 in such a manner as to be rotatable. The cam 52, when rotated about the cylindrical portion 50 relative to the rotor 42, swings the hold lever 60 so as to be capable of allowing its pawl 60A to move into or out of the notch 62 of the lock wheel 38.

More specifically, the cam 52 is provided with control pieces 52A, 52B. The arrangement is as follows: When the cam 52 is rotated about the cylindrical portion 50 relative to the rotor 42 in the webbing draw-out direction (in the opposite direction of arrow A), the pawl 60A of the hold lever is pressed by the control piece 52A so as to swing the hold lever 60 about the pin 61 in the direction of arrow B in FIG. 4. This allows its pawl 60A to move into the notch 62 of the lock wheel 38. On the other hand, when the cam 52 is rotated about the cylindrical portion 50 relative to the rotor 42 in the webbing take-up direction (in the direction of arrow A), the end of the hold lever 60 opposite to the pawl 60A is pressed by the control piece 52B so as to swing the hold lever 60 about the pin 61 in the opposite direction of arrow B. As a result, the hold lever 60 is swung about the pin 61 in the opposite direction of arrow B in FIG. 4, thereby allowing its pawl 60A to move out of the notch 62 of the lock wheel 38, as shown in FIG. 5.

The cam 52 is provided with a cylindrical portion 52C around the center of its rotation. A friction spring 56, which is a lever swinging means, is disposed around the cylindrical portion 52C. The friction spring 56 is a leaf spring bent into a V-shaped configuration, and is adapted to press and clamp cylindrical portion 52C by means of its legs.

Figure 4:
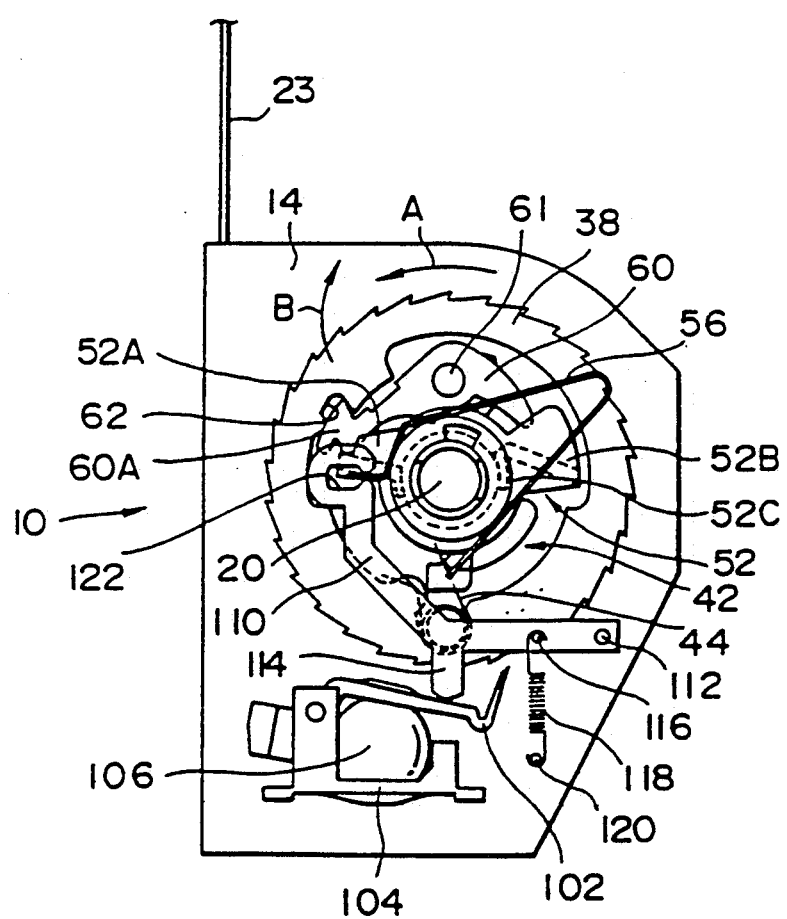
FIGS. 4 to 7 are front elevational views explaining the retractor in accordance with the first embodiment, respectively.
Figure 5:
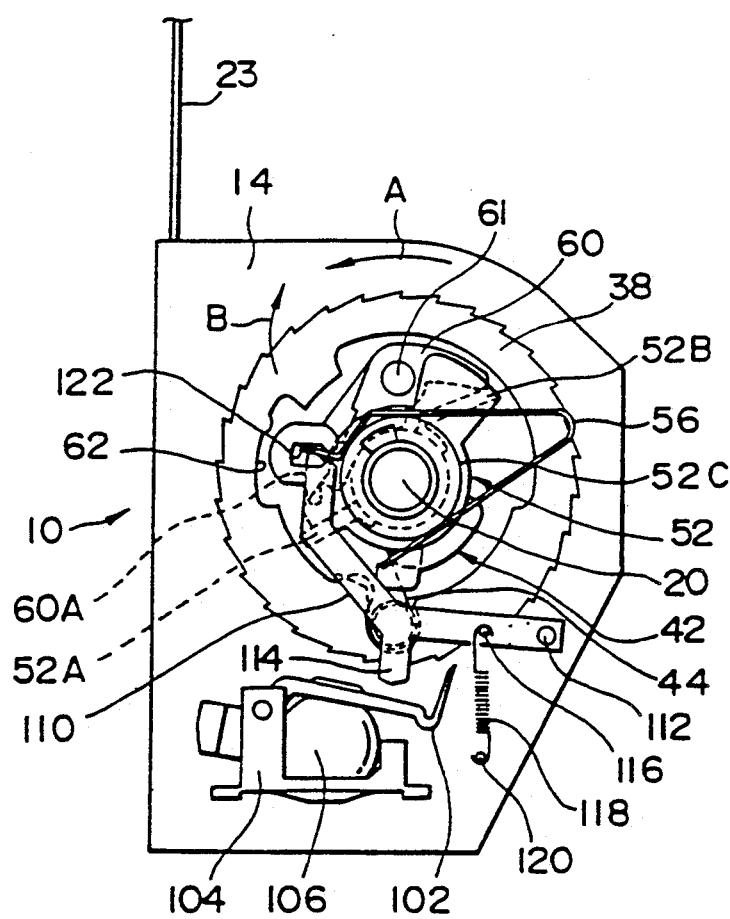

A pawl 102 is disposed below the lock wheel 38, as shown in FIG. 4. A proximal end portion of the pawl 102 is axially supported by a sensor bracket 104 secured to the leg 14. An intermediate portion of the pawl 102 is brought into contact with an upper surface of a sensor ball 106 placed in a recess of the sensor bracket 104, the recess having an inclined bottom surface. A distal end portion of the pawl 102 is opposed to the ratchet teeth formed on an outer periphery of the lock wheel 38.

The arrangement is as follows: the pawl 102 is pressed and moved upward by the sensor ball 106 which rises up the recess of the sensor bracket 104 by means of the inertia caused by a sudden deceleration or the like of the vehicle. The distal end of the pawl 102 engages the ratchet tooth of the lock wheel 38, thereby preventing the lock wheel 38 from rotating in the webbing draw-out direction.

A lever 110 is disposed around the pawl 102, as shown in FIG. 4. The lever 110 has its proximal end pivotally supported by the leg 14 of the frame 10 via a pin 112 (shown in FIG. 4) in such a manner as to be swingable. An actuating piece 114 opposed to the pawl 102 is formed at an intermediate portion thereof. As the lever 110 rotates about the pin 112, the actuating piece 114 is brought into or out of contact with the pawl 102, thereby causing the pawl 102 to be situated either at the position in which it is engageable with the lock wheel 32 or at the position in which it is unengageable with the lock wheel 32. A pin 116 is projectingly provided on the lever 110 between the actuating piece 114 and the proximal end of the lever 110. One end of a tension spring 118 is retained by the pin 116. The other end of the tension spring 118 is retained by the leg 14 of the frame 10 via a pin 120 (shown in FIG. 4) so as to urge the lever 110 around the pin 112, preventing the pawl 102 from being engaged with the lock wheel 38.

An engaging groove 122 for engaging with one leg of the friction spring 56 is formed at a distal end of the lever 110.

When the take-up shaft 20 rotates in the webbing draw-out direction, the friction spring 56, which is engaged with the lever 110, causes the lever 110 to swing about the pin 112 against the urging force of the tension spring 118, making the pawl 102 engageable with the lock wheel 38. At the same time, the friction spring 56 causes the pawl 60A of the hold lever 60 to move out of the notch 62 of the lock wheel 38 via the cam 52, thereby making the lock wheel 38 and the take-up shaft 20 rotatable relative to each other. On the other hand, when the take-up shaft 20 rotates in the webbing taking-up direction, the friction spring 56 causes the lever 110 to swing about the pin 112 by means of the urging force of the tension spring 118, making the pawl 102 unengageable with the lock wheel 38. At the same time, the friction spring 56 causes the pawl 60A of the hold lever 60 to move into the notch 62 of the lock wheel 38, thereby making it impossible for the take-up shaft to rotate in the webbing drawing-out direction relative to the lock wheel 38.

More specifically, a setting is provided in such a manner that the force with which the tension spring 118 urges the lever 110 about the pin 112 is greater than the frictional force acting between the cam 52 and the rotating rotor 42 and is smaller than the frictional force acting between the friction spring 56 and the rotating cam 52.

By virtue of this setting, when the take-up shaft rotates in the webbing draw-out direction (in the opposite direction of arrow A), the cam 52 in the state shown in FIG. 4 rotates in the webbing take-up direction (in the direction of arrow A) relative to the rotor 42. Due to this relative rotation, the hold lever 60 swings about the pin 61 in the opposite direction of arrow B, with the result that its pawl 60A moves out of the notch 62 of the lock wheel 38, thereby making the lock wheel 38 and the take-up shaft 20 rotatable relative to each other. Subsequently, the friction spring 56 and the cam 52 rotate relative to each other with the amount of rotation of the cam 52 restricted by the hold lever 60. The frictional force occurring at this time overcomes the urging force of the tension spring 118 and causes the lever 110 to swing about the pin 112, thereby making the pawl 102 engageable with the lock wheel 38. Then, while the webbing 23 is being drawn out, the relative rotation of the cam 52 and the friction spring 56 maintains a state in which the pawl 102 is made engageable with the lock wheel 38. The lock wheel 38 and the take-up shaft are rotatable relative to each other. When the drawing out of the webbing 23 is stopped, the lever 110 is urged by the tension spring 118 and is swung, as shown in FIG. 6, making the pawl 102 unengageable with the lock wheel 38.

Figure 6:
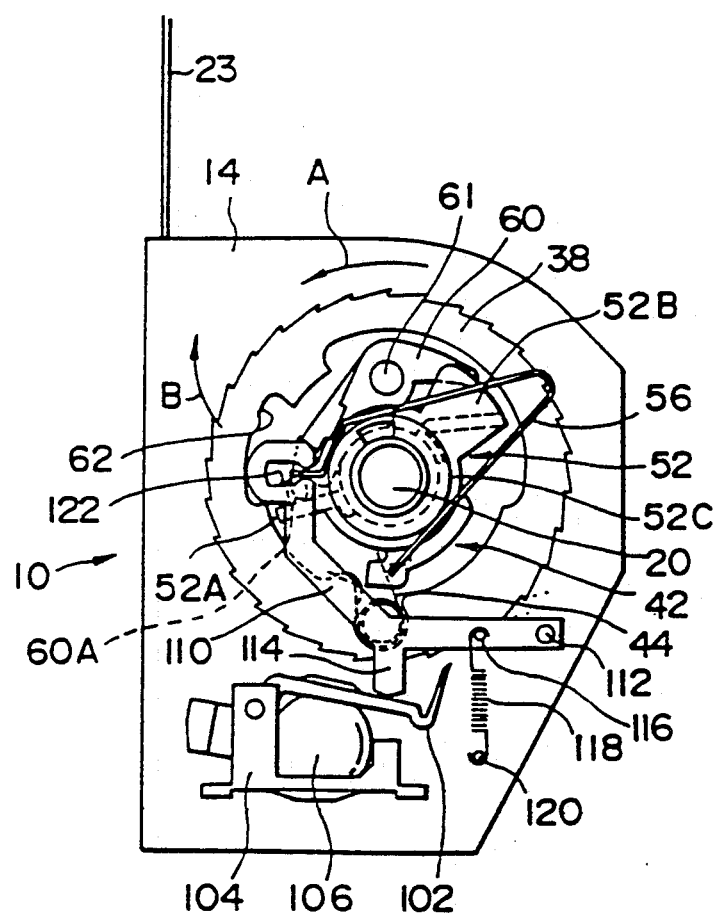
Figure 7:
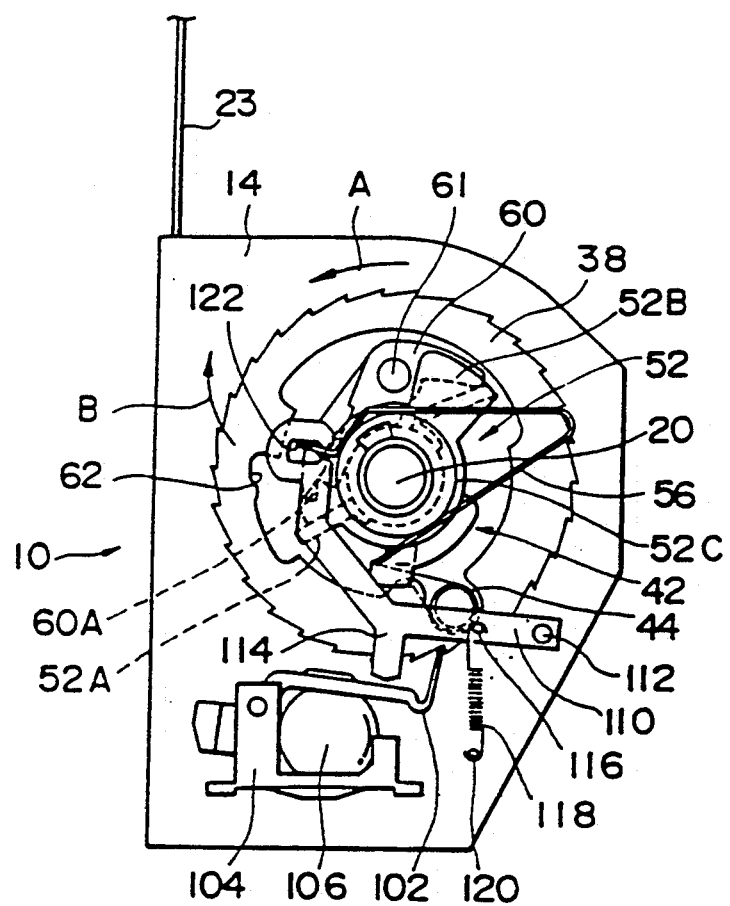

In addition, when the take-up shaft 20 in the state shown in FIG. 6, rotates in the webbing taking-up direction, the cam 52 rotates in the webbing drawing-out direction (in the opposite direction of arrow A) relative to the rotor 42. This relative rotation causes the hold lever 60 to swing about the pin 61 in the direction of arrow B, and causes its pawl 60A to move into the notch 62 of the lock wheel 38, making it impossible for the lock wheel 38 and the take-up shaft 20 to rotate relative to each other. Then, while the webbing 23 is being taken up, the relative rotation of the cam 52 and the friction spring 56 maintains a state in which the pawl 102 is unengageable with the lock wheel 38, and the lock wheel 38 and the take-up shaft 20 are prevented from rotating relative to each other. Even after the taking-up of the webbing 23 is stopped, the same state is maintained.

A sensor cover 54 is secured to the leg 14 of the frame 10, and the respective parts around the lock wheel 38 are accommodated in the sensor cover 54.

In the webbing retractor in accordance with this embodiment thus constructed, the frame 10 is mounted on a chassis via bolts. In a case where this retractor is used for a three-point seatbelt of a continuous webbing type, an end of the webbing 23 drawn out from the take-up shaft 20 is retained by the chassis via an anchor member. An intermediate portion of the webbing 23 is turned back at a slip joint (not shown) retained by the chassis. Furthermore, a tongue plate (not shown) is attached to an intermediate portion between the anchor member and the slip joint in such a manner as to be longitudinally slidable. Then, when the seated occupant draws out the webbing 23 from the take-up shaft 20 and causes the tongue plate to engage with a buckle device (not shown) attached to the chassis, the webbing is fastened around the occupant's body.

A description will now be given of the operation of the retractor in accordance with this embodiment.

First, a description will be given of the normal state in which the lock mechanism is not in operation.

In the state in which the webbing 23 has been fully taken up, the take-up shaft remains stopped after having rotated in the webbing taking-up direction. The relative positional relationships of the retractor components are in the state shown in FIGS. 2 and 4.

In other words, as shown in FIG. 2, the lock mechanism is not operating. FIG. 4 shows that the pawl 60A of the hold lever 60 is placed in the notch 62 provided on the inner periphery of the lock wheel 38, which makes the lock wheel 38 and the take-up shaft 20 unrotatable relative to each other. At the same time, the pawl 102 is pressed by the lever 110 by means of the urging force of the tension spring 118 and is hence made unengageable with the lock wheel 38.

When the drawing out of the webbing 23 in this state is commenced, the cam 52 rotates relative to the rotor 42 in the webbing taking-up direction (in the direction of arrow A). This relative rotation causes the hold lever 60 to swing about the pin 61 in the opposite direction of arrow B, which, in turn, causes its pawl 60A to move out of the notch 62 of the lock wheel 38, allowing the lock wheel 38 and the take-up shaft 20 to rotate relative to each other. Subsequently, the friction spring 56 and the cam 52 rotate relative to each other with the amount of rotation of the cam 52 restricted by the hold lever 60. The frictional force occurring at this time overcomes the urging force of the tension spring 118, and causes the lever 110 to swing about the pin 112, thereby allowing the pawl 102 to engage with the lock wheel 38. While the webbing 23 is being drawn out, the relative rotation of the friction spring 56 and the cam 52 maintains a state in which the pawl 102 is engageable with the lock wheel 38, and the lock wheel 38 and the take-up shaft 20 are rotatable relative to each other. When the drawing out of the webbing 23 is stopped, the lever 110 is urged by the tension spring 118 and is swung, making it impossible for the pawl 102 to engage with the lock wheel 38.

In the normal state of the vehicle, by following the change in the posture of the upper part of the body of the occupant wearing the webbing 23, the webbing 23 is drawn out or taken up freely from the take-up shaft 20 and does not restrict the occupant. In other words, this is because the normal rotation of the take-up shaft 20 does not deform the torsion coil spring 44, and relative rotation does not occur between the take-up shaft 20 and the lock wheel 38.

When the occupant stops wearing the webbing 23, the webbing 23 is taken up by the take-up shaft 20 by the urging force of the spiral spring 27. When the taking up of the webbing 23 is commenced, the cam 52 in the state shown in FIG. 6 rotates relative to the rotor 42 in the webbing drawing-out direction (in the opposite direction of arrow A). This relative rotation causes the hold lever 60 to swing about the pin 61 in the direction of arrow B, and its pawl 60A moves into the notch 62 of the lock wheel 38, thereby making it impossible for the lock wheel 38 and the take-up shaft to rotate relative to each other. Then, while the webbing 23 is being taken up, a state is maintained in which the pawl 102 is made unengageable with the lock wheel 38 and the lock wheel 38 and the take-up shaft 20 are unrotatable relative to each other, as shown in FIG. 4. Even after the taking up of the webbing 23 is stopped, the same state is maintained.

At this juncture, if the webbing 23 is taken up very rapidly, the rotation of the take-up shaft 20 stops suddenly at the take-up limit of the webbing. Consequently, the lock wheel 38 tends to deform the coil spring 44 by means of the inertia against the urging force of the torsion coil spring 44 and rotate further relative to the take-up shaft 20, and at the same time the pawl 102 tends to be engaged with the lock wheel 38 due to the shock.

In such a case, however, while the webbing 23 is being taken up, the pawl 60A of the hold lever 60 moves into the notch 62 provided at the inner periphery of the lock wheel 38, as shown in FIG. 4. The result is that a state is maintained in which the lock wheel 38 and the take-up shaft are prevented from rotating relative to each other. Hence, the lock wheel 38 is prevented from rotating further relative to the take-up shaft 20.

In addition, while the webbing 23 is being taken up, the lever 110 presses the pawl 102, with the result that the state in which the pawl 102 is made unengageable with the lock wheel 38 is maintained, thereby preventing the pawl 102 from engaging with the lock wheel 38.

Accordingly, the possibility of the lock mechanism being operated at the take-up limit of the webbing, which would subsequently involve a cumbersome operation of further drawing out the webbing 23, is eliminated. In addition, even if the webbing 23 is drawn out, the possibility of its tensile force being transmitted to the pawl 102 and causing damage to the pawl 102 is also eliminated.

Next, a description will be given of the state in which the lock mechanism is operated due to a sudden deceleration of the vehicle.

During a sudden deceleration of the vehicle, the webbing 23 is drawn out from the take-up shaft 20 due to the inertia of the occupant. The retractor assumes the state shown in FIG. 5. At this juncture, when the webbing 23 is drawn out suddenly from the take-up shaft 20, the take-up shaft 20 rotates abruptly. A large force instantaneously acts on the torsion coil spring 44 due mainly to the acceleration acting on the lock wheel 38, thereby causing the torsion coil spring 44 to be deformed against its urging force. As a result, since a delay in rotation occurs in the lock wheel 38 relative to the take-up shaft 20, and the lock plates 24, 25 are pressed by the take-up shaft 20, the claw portions 28, 30 are engaged with the internal ratchet wheel 32, as shown in FIG. 3, and thereby prevent the take-up shaft 20 from rotating in the webbing draw-out direction. This results in the occupant being and restrained by the webbing 23.

In addition, when the vehicle decelerates suddenly, the pawl 102 is swung by being pressed by the sensor ball 106 which rises up the recess of the sensor bracket 104, the recess having an inclined bottom surface, due to the inertia of the deceleration. As a result, the pawl 102 engages the lock wheel 38 and prevents the lock wheel 38 from rotating in the webbing draw-out direction. Hence, the lock wheel 38 undergoes a delay in rotation with respect to the take-up shaft 20 which is further rotated by the webbing 23 drawn out by the occupant's inertia due to the sudden deceleration of the vehicle. Accordingly, the drawing out of the webbing 23 is prevented in the same way as described above, so that the occupant is restrained by the webbing 23.

In the foregoing explanation, a description has been given separately with respect to one case where the webbing 23 is drawn out suddenly from the take-up shaft 20 and another case where the vehicle is decelerated suddenly. When the vehicle decelerates suddenly, the pawl 102 is swung and the webbing 23 is drawn out suddenly. However, the drawing out of the webbing 23 is prevented in both cases.

Figure 8:
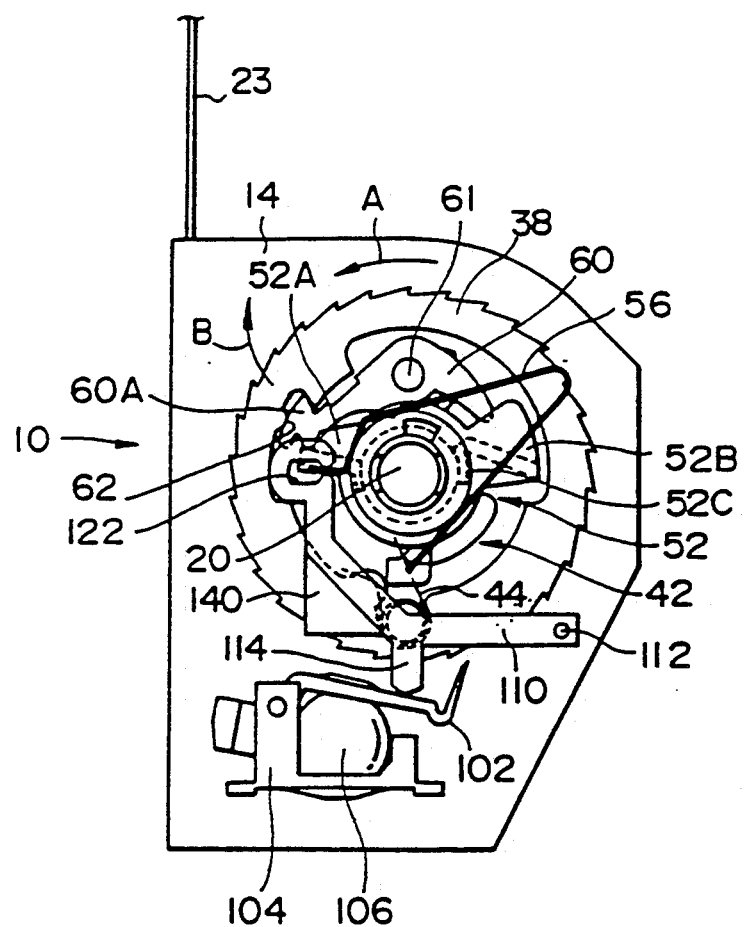
FIGS. 8 to 11 are front elevational views of, respectively second, third, fourth, and fifth embodiments of the invention corresponding to FIG. 4.

FIG. 8 illustrates an essential portion of a second embodiment of the present invention.

In this embodiment, a weight 140 is attached to an intermediate portion of the lever 110. In this embodiment, at the time when the webbing 23 is drawn out, the lever 110 swings about the pin 112 against the weight of the weight 140 and causes the pawl 102 to be engageable with the lock wheel 38. Meanwhile, at the time when the drawing out of the webbing 23 is stopped, the webbing 23 is in a state of being taken up, or the take-up has stopped. At this time the lever 100 is swung about the pin 112 due to the weight of the weight 140, thereby making it impossible for the pawl 102 to engage with the lock wheel 38.

Figure 9:
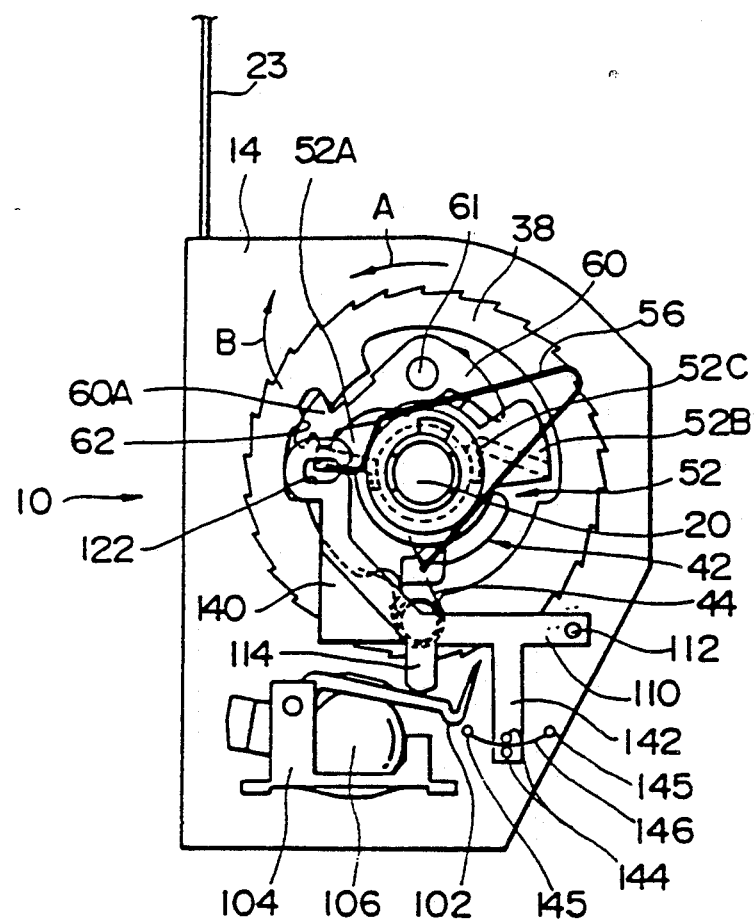

FIG. 9 illustrates a third embodiment of the present invention. In this embodiment, in addition to the arrangement of the second embodiment, a projecting piece 142 is formed at an intermediate portion of the lever 110, and two pins 144 are projectingly provided on the projecting piece 142. A leaf spring 146 is interposed between the pins 144 and is retained by the leg 14 via pins 145.

In this embodiment, the lever 110 is swung about the pin 112 while deforming the leaf spring 146. When the leaf spring 146 is deformed by a predetermined amount, the lever 110 is subsequently swung rapidly by the urging force of the leaf spring 146, creating a snap in the operation of the lever 110.

Figure 10:
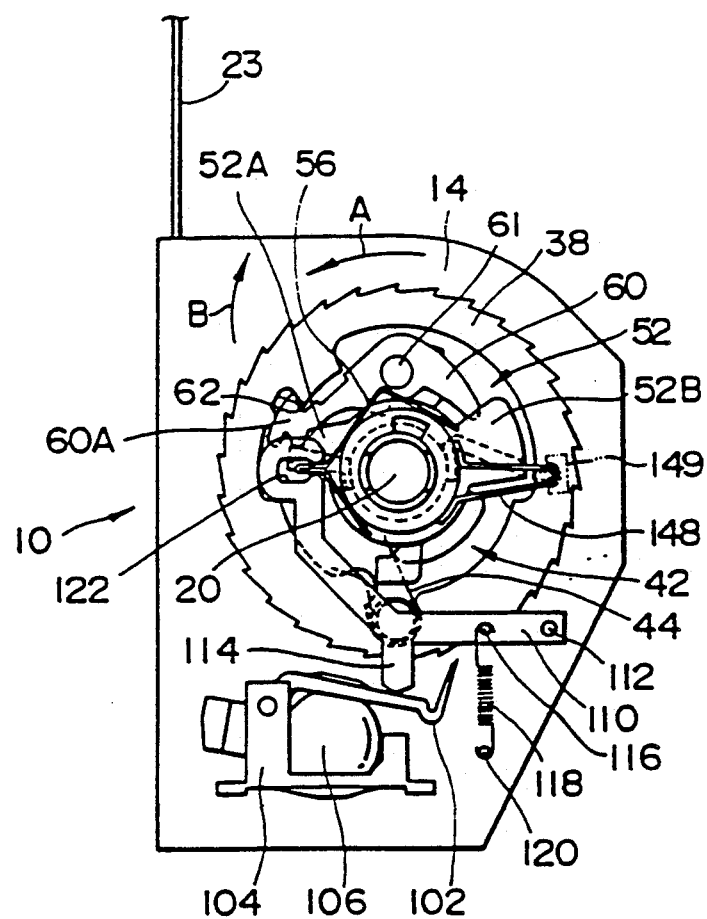

FIG. 10 illustrates a fourth embodiment of the present invention. In this embodiment, in addition to the friction spring 56, another friction spring 148 is pressed against and abuts the outer periphery of the cylindrical portion 52C of the cam 52. This friction spring 148 is supported by the sensor cover 54 via a holder 149.

In this embodiment, at the time of drawing out the webbing 23, the cam 52 rotates in the webbing take-up direction (in the direction of arrow A) relative to the rotor 42 due to a frictional force acting between the cam 52 and the friction spring 148. This rotation causes the hold lever 60 to swing about the pin 61 in the opposite direction of arrow B, so that its pawl 60A moves out of the notch 62 of the lock wheel 38, thereby making the lock wheel 38 and the take-up shaft 20 rotatable relative to each other. Subsequently, the lever 110 is swung about the pin 112 by the frictional force of the friction spring 56 due to the rotation of the cam 52, thereby permitting the pawl 102 to engage with the lock wheel 38.

Figure 11:
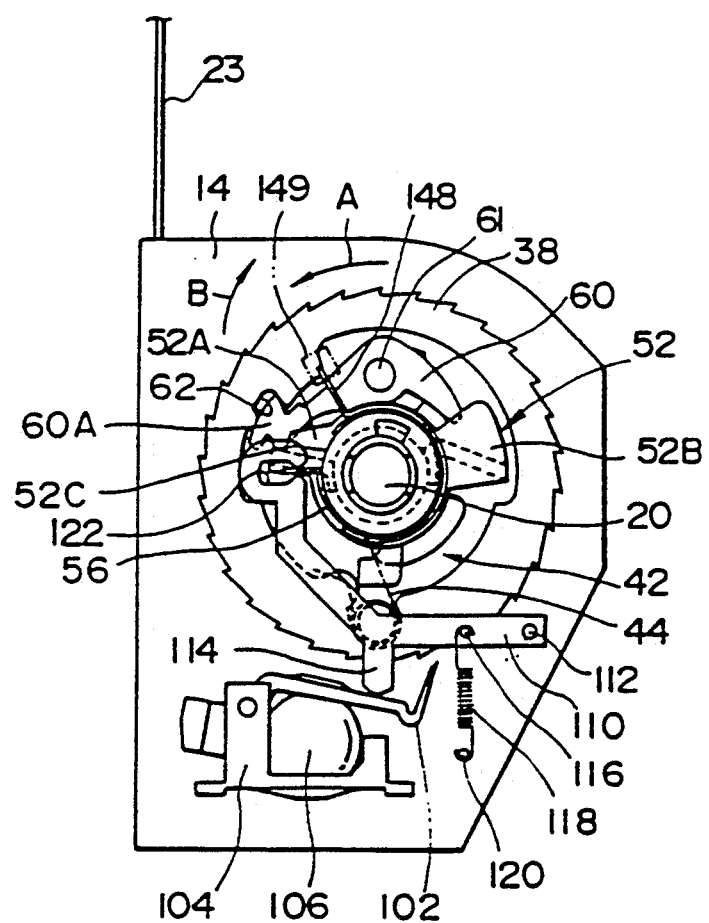

FIGS. 11 and 12 illustrate a fifth embodiment of the present invention. In this embodiment, the friction spring 148 is pressed against and fitted to the outer periphery of the friction spring 56.

Since the operation of this embodiment is basically similar to that of the fourth embodiment, a description thereof will be omitted.

Figure 13:
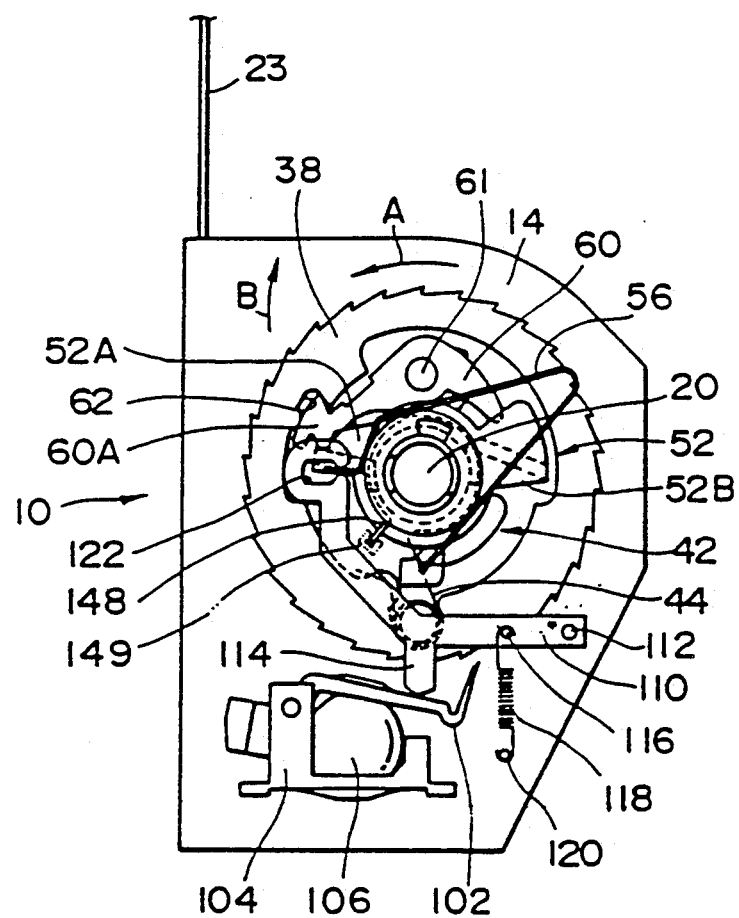
FIG. 13 is a front elevational view of a sixth embodiment corresponding to FIG. 4.
Figure 14:
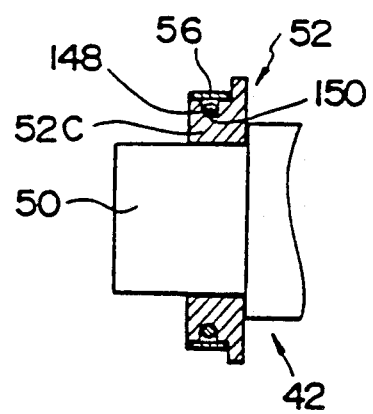
FIG. 14 is a cross-sectional view illustrating a state in which a friction spring shown in FIG. 13 is fitted.

FIGS. 13 and 14 illustrate a sixth embodiment of the present invention. In this embodiment, an annular groove 150 (shown in FIG. 14) is formed on the outer periphery of the cam 52, and the friction spring 148 is pressed against and fitted to the annular groove 150.

Since the operation of this embodiment is similar to the fourth embodiment, a description thereof will be omitted.

As described above, at the time when the vehicle is decelerated suddenly, it is possible to stop the rotation of the take-up shaft in the webbing draw-out direction by the engagement, with the lock wheel, of the pawl operated by sensing the deceleration or by a sudden drawing out of the webbing at that time; relative rotation is caused between the lock wheel and the take-up shaft, and the lock mechanism is operated by this relative rotation. Furthermore, a displacing member is disposed on a rotating member rotating integrally with the take-up shaft, and the displacing member is engaged with the lock wheel by the rotation of the take-up shaft in the webbing take-up direction. This prevents the lock wheel from rotating in the webbing take-up direction relative to the take-up shaft. At the same time, the displacing member is disengaged from the lock wheel by the rotation of the take-up shaft in the webbing draw-out direction, thereby permitting the take-up shaft to rotate in the webbing draw-out direction relative to the lock wheel. Accordingly, the present invention offers an outstanding advantage in that even if the webbing is drawn out from a take-up limit of the webbing, the webbing drawing-out force is prevented from being imparted to the pawl.

What is claimed is:

1. A webbing retractor for taking up a webbing worn by a seat occupant of a vehicle, comprising:
   a take-up shaft by which said webbing is retained and which is urged in a direction in which said webbing is taken up;
   a lock wheel axially supported by said take-up shaft and adapted to be rotatable relative to said take-up shaft;
   lock means which is interposed between said take-up shaft and said lock wheel and which operates so as to prevent said take-up shaft from rotating in a direction in which said webbing is drawn out;
   a pawl which is engaged with said lock wheel at the time of sudden deceleration of said vehicle and causes said lock wheel and said take-up shaft to rotate relative to each other so as to operate said lock means;
   a rotating member adapted to rotate integrally with said take-up shaft;

a displacing member, which is supported by said rotating member, is moved to a first position by the rotation of said take-up shaft in said taking-up direction, is engaged with said lock wheel so as to prevent the rotation of said lock wheel relative to said take-up shaft, is moved to a second position by the rotation of said take-up shaft in said drawing-out direction and is disengaged from said lock wheel so as to permit said relative rotation of said lock wheel;

a lever, which is swingable between a third position, in which the engagement of said pawl with said lock wheel is prevented, and a fourth position, in which the engagement of said pawl with said lock wheel is permitted; and lever swinging means which causes said lever to be located in said third position when said take-up shaft rotates in said taking-up direction and causes said lever to be located in said fourth position when said take-up shaft rotates in said drawing-out direction.

2. A webbing retractor according to claim 1, further comprising cam means for moving said displacing member to said first and second positions.

3. A webbing retractor according to claim 2, further comprising moving means for moving said lever in the direction of said third position when said take-up shaft is not rotating or is rotating in said take-up direction.

4. A webbing retractor according to claim 3, wherein said moving means comprises urging means for urging said lever in the direction of said third position.

5. A webbing retractor according to claim 4, wherein said urging means is constituted by a tension spring.

6. A webbing retractor according to claim 3, wherein said moving means is constituted by a weight that applies weight to said lever in the direction of said third position.

7. A webbing retractor according to claim 6, further comprising snapping means for imparting a snap to said lever at the time when said lever swings.

8. A webbing retractor according to claim 3, wherein said lever swinging means comprises a first friction spring a part of which is engaged with said lever and which is supported by an outer periphery of said cam means by means of a clamping force.

9. A webbing retractor according to claim 8, wherein said cam means is coaxially supported by said rotating member with said take-up shaft and is adapted to be moved in a predetermined range by a frictional force acting between said rotating member and said cam member when said take-up shaft rotates so as to move said displacing member to said first and second positions.

10. A webbing retractor according to claim 8, further comprising a second friction spring adapted to impart a frictional force to said cam means when said take-up shaft rotates in said drawing-out direction.

11. A webbing retractor according to claim 10, wherein said second friction spring is pressed against and fitted an outer periphery of said first friction spring.

12. A webbing retractor according to claim 10, wherein the outer periphery of said cam means is provided with an annular groove and, said second friction spring is pressed against and fitted to said annular groove.

13. A webbing retractor for taking up a webbing worn by a seat occupant of a vehicle, comprising:

a take-up shaft of which one longitudinal end of which is retained and which is rotated by an urging force in a direction in which said webbing is taken up;

a lock wheel which is axially supported by an end portion of said take-up shaft and is rotatable relative to said take-up shaft;

lock means which is interposed between said take-up shaft and said lock wheel and which operates so as to prevent said take-up shaft from rotating in a direction in which said webbing is drawn out;

a pawl which is engaged with said lock wheel at the time of sudden deceleration of said vehicle and causes said lock wheel and said take-up shaft, on which a rotating force in said drawing-out direction acts via said webbing due to the inertia acting on said occupant, to rotate relative to each other so as to operate said lock means;

a rotating member secured in said one end portion of said take-up shaft and adapted to rotate integrally with said take-up shaft;

a displacing member which is axially supported by said rotating member and which is swingable between a first position in which the rotation of said lock wheel relative to said take-up shaft is prevented as said displacing member is engaged with said lock wheel and a second position in which the rotation of said lock wheel relative to said take-up shaft is permitted as said displacing member is disengaged from said lock wheel;

a cam coaxially supported by said rotating member with said take-up shaft and which is rotated in the same direction as the rotating direction of said take-up shaft by a frictional force acting between said cam and said rotating member and causes said displacing member to swing to said first and second positions;

a lever swingable between a third position in which the engagement of said pawl with said lock wheel is prevented and a fourth position in which the engagement of said pawl with said lock wheel is permitted; and a first friction spring, a part of which is engaged with said lever and which is supported by an outer periphery of said cam by a clamping force, said first friction spring being arranged such that when said take-up shaft rotates in said taking-up direction, said first friction spring causes said pawl to be located in said third position and causes said displacing member to be located in said first position via said cam, and when said take-up shaft rotates in said drawing-out direction, said first friction spring causes said pawl to be situated in said fourth position and causes said displacing member to be situated in said second position via said cam.

14. A webbing retractor according to claim 13, further comprising moving means for moving said lever to said third position when said take-up shaft is not rotating.

15. A webbing retractor according to claim 14, wherein said moving means comprises urging means for urging said lever in the direction of said third position.

16. A webbing retractor according to claim 15, wherein said urging means is constituted by a tension spring.

17. A webbing retractor according to claim 15, wherein said moving means is constituted by a weight that applies weight to said lever in the direction of said third position.

18. A webbing retractor according to claim 17, further comprising snapping means for imparting a snap to said lever at the time when said lever swings.

19. A webbing retractor according to claim 13, further comprising a second friction spring adapted to impart a frictional force to said cam when said take-up shaft rotates in said draw-out direction.

20. A webbing retractor according to claim 19, wherein said second friction spring is pressed against and fitted to an outer periphery of said first friction spring.

* * * * *